(12) United States Patent
Xia et al.

(10) Patent No.: US 9,503,567 B2
(45) Date of Patent: Nov. 22, 2016

(54) DISPLAY INTERFACE CONVERTING SYSTEM AND METHOD THEREOF

(71) Applicant: SPREADTRUM COMMUNICATIONS (SHANGHAI) CO., LTD., Shanghai (CN)

(72) Inventors: Lu Xia, Shanghai (CN); Hengzhuang Jin, Shanghai (CN); Haipeng Liu, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 364 days.

(21) Appl. No.: 14/234,452

(22) PCT Filed: Dec. 26, 2013

(86) PCT No.: PCT/CN2013/090521
§ 371 (c)(1),
(2) Date: Jan. 23, 2014

(87) PCT Pub. No.: WO2014/201837
PCT Pub. Date: Dec. 24, 2014

(65) Prior Publication Data
US 2014/0370872 A1   Dec. 18, 2014

(30) Foreign Application Priority Data
Jun. 18, 2013  (CN) .......................... 2013 1 0242450

(51) Int. Cl.
*H04M 1/725*  (2006.01)
*G06F 3/0481*  (2013.01)

(52) U.S. Cl.
CPC ........ *H04M 1/72569* (2013.01); *G06F 3/0481* (2013.01); *H04M 1/72563* (2013.01); *H04M 1/72572* (2013.01)

(58) Field of Classification Search
CPC .................. H04M 1/725; H04M 1/72569
USPC .......................................... 455/456.1–456.6
See application file for complete search history.

(56) References Cited

U.S. PATENT DOCUMENTS

| | | | | |
|---|---|---|---|---|
| 2006/0105816 | A1* | 5/2006 | Hwang | H04M 1/021 455/566 |
| 2007/0066364 | A1* | 3/2007 | Gil | H04M 1/72561 455/566 |
| 2009/0233629 | A1* | 9/2009 | Jayanthi | H04L 12/5865 455/457 |

*Primary Examiner* — Michael T Vu
(74) *Attorney, Agent, or Firm* — Thomas J. Engellenner; Reza Mollaaghababa; Pepper Hamilton LLP

(57) ABSTRACT

The present invention discloses a display interface converting system and a method thereof, which belongs to the technical field of mobile terminal interface transformation. The system comprises a display interface adjustment module, a storage module and a condition capturing module. The storage module has preconfigured a transformation condition data and has preconfigured the corresponding adjustment strategy. The method includes: transmitting the captured condition data to the display interface adjustment module; comparing the condition data with the preconfigured transformation condition data; obtaining the corresponding adjustment strategy and adjusting the display interface according to the adjustment strategy if the comparison is successful. The beneficial effects of this technical scheme are that as follows: it provides the user with different display interface corresponding to the different circumstances in the mobile terminal, consequently the mobile terminal is more personalized, and the user's application experience is improved.

14 Claims, 3 Drawing Sheets

DISPLAY INTERFACE CONVERTING SYSTEM AND METHOD THEREOF

TECHNICAL FIELD

The present invention relates to a technical field of converting the mobile terminal interface, more specifically, to a display interface converting system and the method thereof.

BACKGROUND OF THE INVENTION

With the development of the mobile terminal technology, the demand has gradually been changed from owning a portable mobile device with communication capabilities to owning a portable mobile device with personalized tag. Alternatively, at present, utilizing the mobile terminal to realize the basic function of communication, such as making a phone call, sending short messages and visit the internet, will not meet the demands of people. The needed is the mobile terminal capable of simulating the environment of real life or the designed according to the personal preferences. Meanwhile, what intuitively reflects the above mentioned demands are the image content displayed on the display screen. In prior art, the background content displayed on the display screen of the mobile terminal generally is the fixed wallpaper, or the wallpaper operating according to the preconfigured strategy including the time interval, the sequence for replacing and so on. There is no scheme of real time adjusting the background content displayed on the display screen according to the identity information of the users and the surrounding environment data.

Chinese Patent Publication No. CN102572121A discloses a mobile phone of automatically adjusting screen brightness along with sunlight intensity and an implementation method thereof. The mobile phone of automatically adjusting the screen brightness along with the sunlight intensity is mainly and technically characterized in that a non-function zone on the surface of the mobile phone is provided with a mini-type solar panel connected with an original control circuit for a display of a mobile phone screen; when the backlight of the mobile phone screen is set to be in an automatic brightness adjusting state, the current value of the solar panel is judged by a control unit of the mobile phone, and the strength of the injection current of the mobile phone screen is adjusted according to a judged result to adjust the brightness of the mobile phone screen. The above mentioned technical scheme is related to adjusting the backlight of the display screen of mobile phone, however, the brightness of the display screen of mobile phone is adjusted by adjusting the brightness of the brightness of backlight, which is not related to adjusting the image displayed on the display screen of mobile phone.

Chinese Patent Publication No. CN101986300A discloses a dynamic layout adjustment-based mobile Widget cross-platform implementation method and belongs to the technical field of mobile communication. The method comprises the following steps that: a screen extraction module extracts screen information; a layout extraction module extracts current layout information; an analysis module analyzes the extracted screen information and layout information; and a layout adjustment module adjusts the layout so as to make the layout difference in an allowed range. The invention provides a terminal equipment-based method for dynamically adjusting page layout aiming at the inconsistency of the page layout when the mobile Widget crosses a platform. As different mobile phones have different screens, the pictures on different mobile phones are different. In the method, when the terminal equipment downloads the mobile Widget, the screen information of the terminal equipment is extracted, the extracted screen information is analyzed, whether the current page layout is in the allowed range is judged so as to dynamically adjust the page layout, and the adjusted layout information is finally buffered into a list to serve as a reference in the process of operating other mobile Widgets. The above mentioned technical scheme is mainly related to dynamically adjusting the display format of images on the different display screens of the mobile terminals, which does not solve the problems to be overcome in the present invention.

SUMMARY OF THE INVENTION

According to the defects existing in prior art, a display interface converting system and a method thereof are provided, specifically comprising:

A display interface converting system applied to the mobile terminal; wherein including a display interface adjustment module, a storage module and a condition capturing module; the display interface adjustment module is respectively connected to the condition capturing module and the storage module; the storage module has preconfigured a transformation condition data used for adjusting the display interface of the mobile terminal operating system and has preconfigured the corresponding adjustment strategy;

the condition capturing module is used for capturing the external condition data, and transmits the condition data to the display interface adjustment module;

the display interface adjustment module compares the conditional data with the transformation condition data preconfigured in the storage module; according to the comparison results, the display interface adjustment module obtains the preconfigured corresponding adjustment strategy from the storage module to adjust the display interface;

alternatively, the display interface adjustment module is also remotely connected to a strategy adjusting storage server; the strategy adjusting storage server is set with the preconfigured transformation condition data and is set with the adjustment strategy corresponding to the transformation condition data;

the display interface adjustment module compares the conditional data with the transformation condition precon-figured in the strategy adjusting storage server; according to the comparison results, the display interface adjustment module obtains the preconfigured corresponding adjustment strategy from the strategy adjusting storage server to adjust the display interface.

Preferably, according to the above display interface converting system, wherein the display interface adjustment module is connected to the strategy adjusting storage server by a communication module.

Preferably, according to the above display interface converting system, wherein the display interface adjustment module is connected to a data updating server by a communication module; the data update serve is preconfigured with the transformation condition data and the corresponding adjustment strategy; according to the preconfigured time interval, the display interface adjustment module obtains the transformation conditions data and the corresponding adjustment strategy from the data updating server and stores them in the storage module.

Preferably, according to the above display interface converting system, wherein the strategy adjusting storage server and the data updating server are formed by one hardware equipment.

Preferably, according to the above display interface converting system, wherein the conditional capturing module comprises a positioning component; the positioning component is used to determine the current position data of the mobile terminal; the location data is included in the condition data and the transformation condition data.

Preferably, according to the above display interface converting system, wherein the positioning component is a GPS positioning device.

Preferably, according to the above display interface converting system, wherein the condition capturing module comprises a sensing component; the sensing component is used for collecting the environmental data around the mobile terminals; the environmental data is included in the condition data and the transformation conditional data.

Preferably, according to the above display interface converting system, wherein the sensing component is a light sensor; the light sensor is used for sensing the brightness of the external environment and for obtaining the corresponding environmental data.

Preferably, according to the above display interface converting system, wherein the sensing component is the camera of the mobile terminals; according to the collected image data, the camera determines the brightness of the external environment and obtains the corresponding environmental data.

Preferably, according to the above display interface converting system, wherein the condition capturing module comprises a wireless connecting detection component; the wireless connecting detection component is used for detecting the identification data of the wireless hotspot connected by the mobile terminal; the identification data is included in the condition data and the transformation condition data.

Preferably, according to the above display interface converting system, wherein the condition capturing module includes a clock component; the clock component is used to provide a real time data; and the real time data is included in the conditional data and the transformation condition data.

Preferably, according to the above display interface converting system, wherein the condition data comprises the identity information and preference information of the users; and the transformation condition data comprises the identity information and preference information of the users.

Preferably, according to the above display interface converting system, wherein it also including an input device; the input device is respectively connected to the condition capturing module and the storage module; the input device is provided to the users for setting the preconfigured transformation condition data and for inputting the condition data.

A method for converting the display interface, which is suitable for the mobile terminal, wherein adopting the above system, comprising the following steps:

Step 1, the condition capturing module captures the condition data and transmits the condition data to the display interface adjustment module;

Step 2, the display interface adjustment module compares the condition data with the preconfigured transform condition data; and Step 3, if the comparison is successful, the display interface adjustment module obtains the corresponding adjustment strategy and adjusts the display interface according to the adjustment strategy.

Preferably, according to the above method for converting the display interface, wherein in Step 3, if the comparison is not successful, the display interface adjustment module does not obtain the adjustment strategy.

The beneficial effects of the said technical scheme are: applying the different preconfigured conditions to activate the different adjustment strategies, thereby, providing the user with the different display interfaces corresponding to the different circumstances on the mobile terminal; consequently, the mobile terminal is more personalized, and the application experience of the user is improved.

BRIEF DESCRIPTIONS OF THE DRAWINGS

DESCRIPTIONS OF THE PREFERRED EMBODIMENT(S)

The present invention will be further illustrated in combination with the following figures and embodiments, but it should not be deemed as limitation of the present invention.

Figure 1:
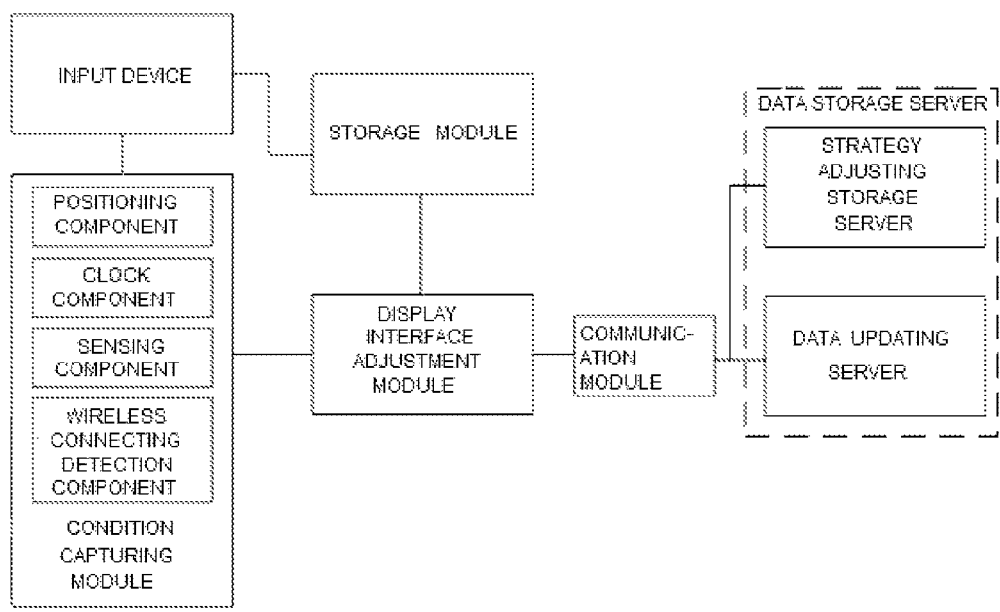
FIG. 1 shows a structure diagram of the display interface converting system in the embodiment of the present invention.

As shown in FIG. 1, in the embodiment of the present invention, a display interface converting system comprises a condition capturing module, a display interface adjustment module and a storage module. The display interface adjustment module is respectively connected to the condition capturing module and the storage module.

The condition capturing module includes a variety of condition capturing components. The different condition capturing components are used to capture the different condition data. The storage module is set with a preconfigured transformation condition data used for adjusting the display interface of the mobile terminal and is set with the corresponding adjustment strategy. The display interface adjustment module compares the preconfigured transformation condition data with the different condition data, and obtains the corresponding adjustment strategy to adjust the display interface according to the comparison results. In the embodiment of the present invention, the operation of adjusting the display interface includes adjusting the scenes displayed on the display screen and the corresponding widget group. The representation of the Widget group displayed on display screen can be videos, maps, news or small game and so on.

Meanwhile, the display interface adjustment module is also remotely connected by a communication module to the external strategy adjusting storage server and the data updating server. The strategy adjusting storage server and the data updating server are also set with the preconfigured transformation condition data and the corresponding adjustment strategy. The display interface module can also compare the transformation condition data in the adjustment strategy storage sever with the condition data transmitted from the condition capturing module, and obtains the corresponding adjustment strategy in the data storage server to adjust the display interface according to the comparison results. The data updating server mentioned in the embodiment of the present invention is used to provide the real time updated data for the storage module, i.e., the data updating server provides the real time updating function to the display interface converting system.

Alternatively, the expression of the above description is that as follows: according to the type of the condition data transmitted, the display interface adjustment module can obtain the transformation condition data from the local storage module or the remote server to compare, and can obtain the corresponding adjustment strategy to adjust the display interface.

In the embodiment of the present invention, a data storage server is adopted to be remotely connected to the display interface adjustment module. The transformation condition data and the adjustment strategy stored in the data storage server can not only be applied to the display interface converting system for obtaining and comparing, but also to the real time data to the display interface converting system to update the data of the local storage module. In other words, in the embodiment of the present invention, a data storage server can be adopted to realize the function of the strategy adjusting storage server and the data updating server. In the following embodiments of the present invention, a data storage server is also adopted to adjust the combination of the strategy adjusting storage server and the data updating server.

The above mentioned embodiment is just a preferred embodiment of the present invention, which dose not limit the number and the functions of the servers in the present invention. Any of the improvements performed based on the idea of the present invention are all involved in the scope of the protection of the present invention.

In the embodiment of the present invention, an input device is also included in the said system. The input device may be a keyboard or a touch screen of the mobile terminal. The input device is respectively connected to the condition capturing module and the storage module. In the embodiment of the present invention, the input device is used for setting the preconfigured transformation condition data in the storage module, and for inputting the condition data required for the condition capturing module. Consequently, in the embodiment of the present invention, the transformation condition data and the condition data capable of being set may comprise the identity information of the user, such as the sex, the age, and the preference information, such as religious belief and interests. The display interface adjustment module can adjust the display interface based on the identity information of the user. For example, when the user is the elderly, the display interface adjustment module can add the widget groups and the information of stock, lottery or health knowledge onto the display interface; when the user is the youngster, the display interface adjustment module can add the widget groups and the information of music, network or entertainment onto the display interface; when the user is the one who believes in a certain religion, the display interface adjustment module can add the characteristic object or the religious books and the like corresponding to the religion onto the display interface; when the user has some hobbies such as sports, the display interface adjustment module can add the widget groups and the information corresponding to the sports. The said adjusting strategies can be combined into different adjustment strategy groups according to the different requirement. Certainly, the user can activate a special preconfigured adjustment strategy or a special present adjustment strategy group by inputting the user authentication information, such as the user name and the password, thereby, the display interface are adjusted correspondingly.

In the embodiment of the present invention, the condition capturing module comprises a positioning component. The positioning component can be a GPS positioning device for obtaining the current position data of the mobile terminal. The condition capturing module transmits the said position data to the display interface adjustment module. Consequently, the location data can be included in the condition data and the transformation condition data. Since position data acquired by the GPS positioning device is not fixed, it is not realistic to store the adjustment strategies corresponding to all the position data in the local storage module. Hence, the display interface adjustment module obtains the corresponding transformation condition data from the remote data storage server and conducts a comparison. Next, the display interface adjustment module obtains the corresponding adjustment strategies preconfigured in the data storage server to adjust the display interface. For example, when the mobile terminal of the GPS positioning device is currently located at a certain city, the display interface adjustment module obtains the virtual model corresponding to the city from the remote server, which may be a characteristic building of the city, or the buildings near the position where the mobile terminal located, or other representation. The said virtual model is used as the display interface of the mobile terminal. Certainly, the display interface adjustment module can also obtain the weather conditions corresponding to the city, which can be displayed on the display interface simultaneously.

Figure 2:
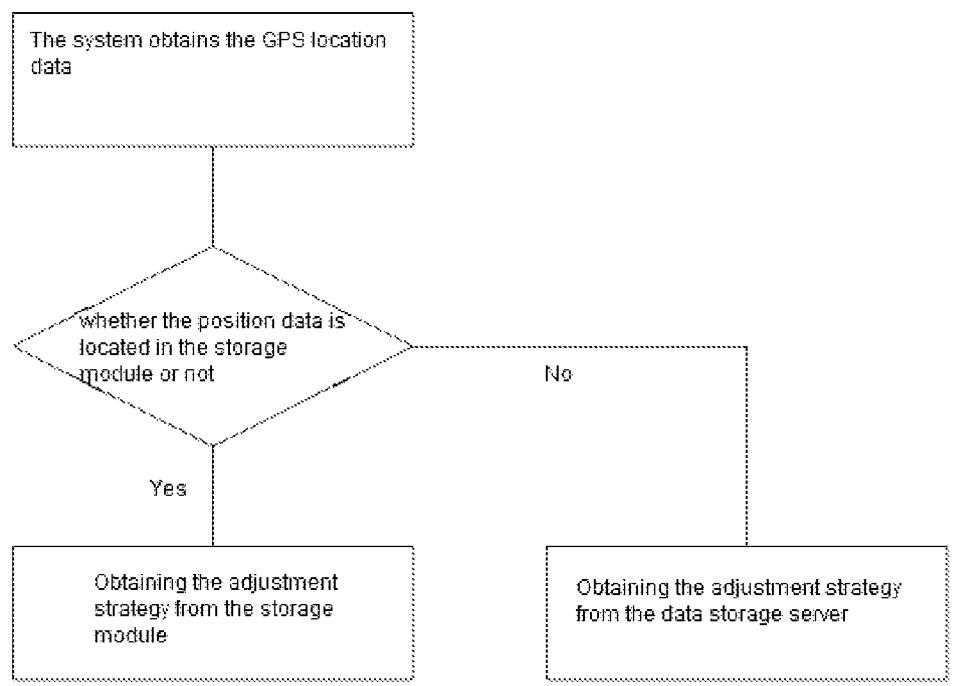
FIG. 2 shows a flow chart of converting the display interface by the positioning component in the embodiment of the present invention.

Certainly, under some circumstance, the storage module of the system can store the geographic model data around some frequently used position information. As shown in FIG. 2, when the adjustment is performed by the said positioning component, the system firstly obtains the data of GPS to determine the position information; next, the system judges whether the geographical model data corresponding to the said position information is in the storage module or not; if the said geographical model data is existed, the system directly obtains the geographical model data from the storage module and correspondingly adjusts the display interface; if the said geographical model data is not existed, the system directly obtains the corresponding geographical model and correspondingly adjusts the display interface.

When some certain geographical models are stored in the storage module, it is necessary for the system to obtain the latest corresponding data from the data updating server regularly to update. The time interval of the update process can be set by the user. In the embodiment of the present invention, the system can directly obtain the real time update data from the data storage server combined with the updating function.

In the embodiment of the present invention, the condition capturing module may also include a clock component which is used to provide the real time information. The display interface adjustment module selects the different display interfaces to display on the display screen according to the real time information. Consequently, the condition data and the preconfigured transformation condition data should be composed of the corresponding time information.

For example, in the embodiment of the present invention, the user has preconfigured the adjustment strategy which displays the special display interfaces at the special moments. For instance, the nine o'clock is the time for working for the user everyday. When the real time moment captured by the clock component is 9 a.m., the display interface is adjusted to display the corresponding office applications and information, such as the short message, contact list and note, by the display interface adjustment module according to the preconfigured adjustment strategy. Simultaneously, the whole layout of the display interface may be adjusted to the layout similar to the layout of office. However, when at 5 p.m., the work of the user is over, the real time moment captured by the clock component is 5 p.m. At this moment, the display interface is adjusted to display the corresponding household applications and information, such as the various entertainment applications, by the display interface adjustment module according to the preconfigured adjustment strategy. Simultaneously, the whole layout of the display interface may be adjusted to the layout similar to the layout of home furnishing.

In the embodiment of the present invention, the clock component can play a role of timing as well, i.e., the display interface can be converted at a preconfigured time interval by the clock component.

In the embodiment of the present invention, the condition capturing module also includes a sensing component. The sensing component can be a light sensor or a camera equipped on the mobile terminal.

When the condition capturing module comprises the light sensor, the light sensor obtains the ambient light data by obtaining the corresponding ambient light signal, and the data is transmitted to the display interface adjustment module by the said light sensor; the display interface adjustment module conducts a comparison to the light data, and adjusts the brightness of the display interface by adopting the corresponding preconfigured adjustment strategy.

When the condition capturing module comprises the camera equipped on the mobile terminal, the camera obtains the ambient light data by analyzing the image information of the surrounding obtained by the camera; the display interface adjustment module conducts a comparison to the light data, and adjusts the brightness of the display interface by adopting the corresponding preconfigured adjustment strategy.

Hence, the related data which is in regard to the ambient light should be included in the condition data and the transformation condition data.

In the embodiment of the present invention, the system can also include a light sensor and a camera equipped on the system.

In the above mentioned embodiment, the adjustment of the brightness of the display interface is realized by adjusting the display light and the color of the display interface. Specifically, the ambient light can be adjusted by configuring the ambient light parameters, i.e., the standard of opengl, in the mobile terminal system; besides, the changes of the brightness, such as the obvious non gradual changes of lighting up and lighting off or the like, can be realized by replacing the chartlet of the display interface. The above adjustment is completely different from the adjustment which changes the brightness by adjusting the backlight of the display screen in prior art.

In the embodiment of the present invention, the condition capturing module may also include a wireless connecting detection component, i.e., WiFi. The wireless connection detection component is used for detecting the hostname of the WiFi connected to the current mobile terminal, i.e., SSID (Service Set Identifier) of the host. The display interface adjustment module correspondingly adjusts the display interface according to the data of SSID, such as determining the different display scenes and the corresponding widget groups according to different data of SSID.

The various condition capturing components can be used jointly, and the comprehensive adjustment and control of the display interface is realized by transmitting the data package comprising various condition data to the display interface adjustment module.

Figure 3:
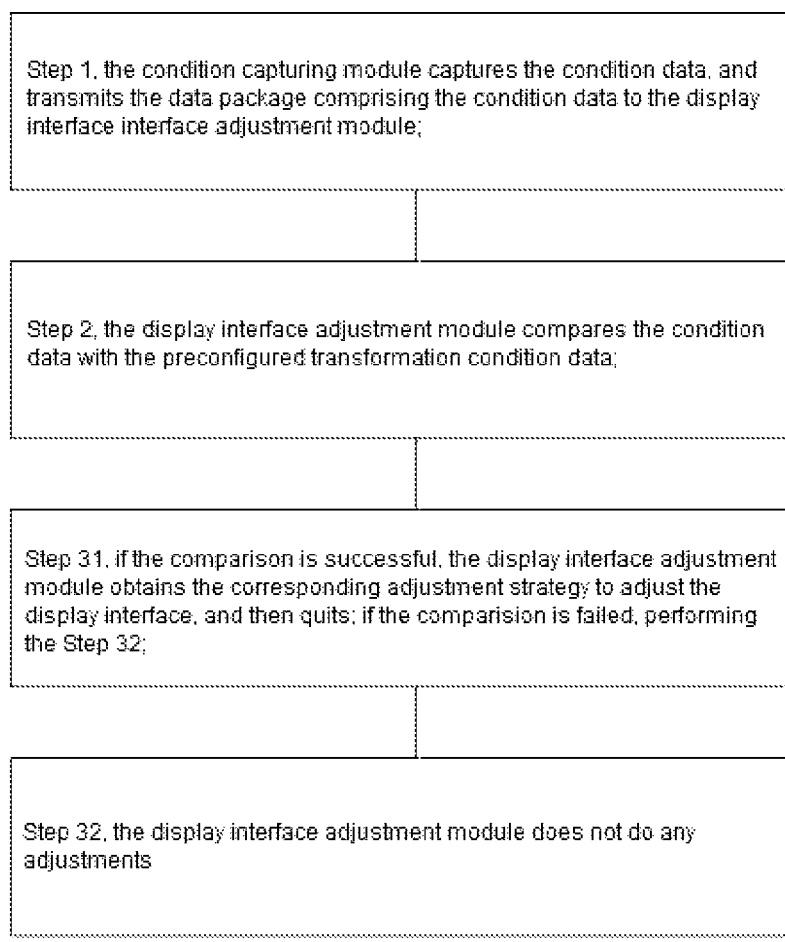
FIG. 3 shows a flow chart of the display interface converting system in the embodiment of the present invention.

As shown in FIG. 3, in the embodiment of the present invention, a method for converting the display interface, which applies the said display interface converting system, comprising:

Step 1, the condition capturing module captures the condition data, and transmits the data package comprising the condition data to the display interface adjustment module;

Step 2, the display interface adjustment module compares the condition data with the preconfigured transformation condition data which is preconfigured in the storage module or the data storage server;

Step 31, if the comparison is successful, the display interface adjustment module obtains the corresponding adjustment strategy which is correspondingly preconfigured in the storage module or the data storage server, to adjust the display interface;

Step 32, if the comparison is failed, the display interface adjustment module does not do any adjustments.

Although a typical embodiment of a particular structure of the specific implementation way has been given with the above description and the figures, it is appreciated that other changes based on the spirit of this invention may also be made. Though the preferred embodiments are proposed above, these contents will never be the limitation of this invention.

It is obvious for the skilled in the art to make varieties of changes and modifications after reading the above descriptions. Hence, the Claims attached should be regarded as all the changes and modifications which cover the real intention and the range of this invention. Any and all equivalent contents and ranges in the range of the Claims should be regarded belonging to the intention and the range of this invention.

The invention claimed is:

1. A display interface converting system applied to the mobile terminal, wherein the display interface converting system comprises:
    a display interface adjustment module;
    a storage module;
    a condition capturing module;
    wherein the display interface adjustment module is respectively connected to the condition capturing module and the storage module; the storage module has preconfigured a transformation condition data used for adjusting the display interface of the mobile terminal operating system and has preconfigured the corresponding adjustment strategy; the condition capturing module is used for capturing the external condition data, and transmitting the condition data to the display interface adjustment module; the display interface adjustment module compare the conditional data with the transformation condition data preconfigured in the storage module; according to the comparison results, the display interface adjustment module obtains the preconfigured corresponding adjustment strategy from the storage module to adjust the display interface; alternatively, the display interface adjustment module is also remotely connected to a strategy adjusting storage server; the strategy adjusting storage server is set with the preconfigured transformation condition data and is set with the adjustment strategy corresponding to the transformation condition data; the display interface adjustment module compares the conditional data with the transformation condition preconfigured in the strategy adjusting storage server; according to the comparison results, the display interface adjustment module obtains the preconfigured corresponding adjustment strategy from the strategy adjusting storage server to adjust the display interface; and wherein the display interface adjustment module is connected to a data updating server by a communication module; the data update server is preconfigured with the transformation condition data and the corresponding adjustment strategy; according to the preconfigured time interval, the display interface adjustment module obtains the transformation conditions data and the corresponding adjustment strategy from the data updating server and stores them in the storage module.

2. The display interface converting system as disclosed in claim 1, wherein the display interface adjustment module is connected to the strategy adjusting storage server by a communication module.

3. The display interface converting system as disclosed in claim 1, wherein the strategy adjusting storage server and the data updating server are formed by one hardware equipment.

4. The display interface converting system as disclosed in claim 1, wherein the conditional capturing module comprises a positioning component; the positioning component is used to determine the current position data of the mobile terminal; the location data is included in the condition data and the transformation condition data.

5. The display interface converting system as disclosed in claim 4, wherein the positioning component is a GPS positioning device.

6. The display interface converting system as disclosed in claim 1, wherein the condition capturing module comprises a sensing component; the sensing component is used for collecting the environmental data around the mobile terminals; the environmental data is included in the condition data and the transformation conditional data.

7. The display interface converting system as disclosed in claim 6, wherein the sensing component is a light sensor; the light sensor is used for sensing the brightness of the external environment and for obtaining the corresponding environmental data.

8. The display interface converting system as disclosed in claim 6, wherein the sensing component is the camera of the mobile terminals; according to the collected image data, the camera determines the brightness of the external environment and obtains the corresponding environmental data.

9. The display interface converting system as disclosed in claim 1, wherein the condition capturing module comprises a wireless connecting detection component; the wireless connecting detection component is used for detecting the identification data of the wireless hotspot connected by the mobile terminal; the identification data is included in the condition data and the transformation condition data.

10. The display interface converting system as disclosed in claim 1, wherein the condition capturing module includes a clock component; the clock component is used to provide a real time data; and the real time data is included in the conditional data and the transformation condition data.

11. The display interface converting system as disclosed in claim 1, wherein the condition data comprises the identity information and preference information of the users; and the transformation condition data comprises the identity information and preference information of the users.

12. The display interface converting system as disclosed in claim 11, wherein it also including an input device; the input device is respectively connected to the condition capturing module and the storage module; the input device is provided to the users for setting the preconfigured transformation condition data and for inputting the condition data.

13. A method for converting the display interface, which is suitable for the mobile terminal, wherein adopting a system comprising:

a display interface adjustment module;

a storage module; and a condition capturing module;

where the display interface adjustment module is respectively connected to the condition capturing module and the storage module; the storage module has preconfigured a transformation condition data used for adjusting the display interface of the mobile terminal operating system and has preconfigured the corresponding adjustment strategy; the condition capturing module is used for capturing the external condition data, and transmits the condition data to the display interface adjustment module; the display interface adjustment module compares the conditional data with the transformation condition data preconfigured in the storage module; according to the comparison results, the display interface adjustment module obtains the preconfigured corresponding adjustment strategy from the storage module to adjust the display interface; alternatively, the display interface adjustment module is also remotely connected to a strategy adjusting storage server; the strategy adjusting storage server is set with the preconfigured transformation condition data and is set with the adjustment strategy corresponding to the transformation condition data the display interface adjustment module compares the conditional data with the transformation condition preconfigured in the strategy adjusting storage server; according to the comparison results, the display interface adjustment module obtains the preconfigured corresponding adjustment strategy from the strategy adjusting storage server to adjust the display interface;

wherein the display interface adjustment module is connected to a data updating server by a communication module; the data update serve is preconfigured with the transformation condition data and the corresponding adjustment strategy; according to the preconfigured time interval, the display interface adjustment module obtains the transformation conditions data and the corresponding adjustment strategy from the data updating server and stores them in the storage module;

wherein the method comprises the following steps:

Step 1, the condition capturing module captures the condition data and transmits the condition data to the display interface adjustment module;

Step 2, the environment transformation device compares the condition data with the preconfigured transform condition data; and Step 3, if the comparison is successful, the display interface adjustment module obtains the corresponding adjustment strategy and adjusts the display interface according to the adjustment strategy.

14. The method for converting the display interface as disclosed in claim 13, wherein in Step 3, if the comparison is not successful, the display interface adjustment module does not obtain the adjustment strategy.

\* \* \* \* \*